United States Patent
Park et al.

(10) Patent No.: US 9,928,862 B1
(45) Date of Patent: Mar. 27, 2018

(54) LOOP SHAPING METHODS AND DEVICES FOR DISTURBANCE OBSERVER IN SERVO CONTROL SYSTEMS

(71) Applicant: Seagate Technology LLC, Cupertino, CA (US)

(72) Inventors: Sung Won Park, Yongin (KR); Sangbo Seo, Yongin (KR)

(73) Assignee: Segate Technology LLC, Cupertino, CA (US)

( * ) Notice: Subject to any disclaimer, the term of this patent is extended or adjusted under 35 U.S.C. 154(b) by 0 days.

(21) Appl. No.: 15/280,525

(22) Filed: Sep. 29, 2016

(51) Int. Cl.
*G11B 5/55* (2006.01)
*G11B 5/596* (2006.01)

(52) U.S. Cl.
CPC .......... *G11B 5/556* (2013.01); *G11B 5/59694* (2013.01)

(58) Field of Classification Search
CPC ....... G11B 5/02; G11B 5/5552–5/5565; G11B 5/5582; G11B 5/59627; G11B 5/59694
USPC ............. 360/55, 69, 75, 77.03, 78.05, 78.09
See application file for complete search history.

(56) References Cited

U.S. PATENT DOCUMENTS

| | | | | |
|---|---|---|---|---|
| 6,563,665 B1 * | 5/2003 | Ell | ........................ | G11B 5/5552 360/78.05 |
| 6,741,417 B2 * | 5/2004 | Hsin | ..................... | G11B 5/5552 360/78.05 |
| 6,898,039 B2 * | 5/2005 | Kobayashi | ........... | G11B 5/5526 360/78.09 |
| 7,019,938 B2 * | 3/2006 | Miyata | ................ | G11B 5/5552 360/78.05 |
| 7,031,099 B2 * | 4/2006 | Kohso | .................. | G11B 5/5552 360/78.05 |
| 7,038,877 B2 * | 5/2006 | Kohso | .................... | G11B 5/556 360/78.05 |
| 7,054,094 B2 | 5/2006 | Zhang et al. | | |
| 7,319,570 B2 | 1/2008 | Jia et al. | | |
| 7,564,644 B2 | 7/2009 | Kim et al. | | |
| 7,595,956 B2 * | 9/2009 | Guo | ..................... | G11B 5/5552 360/78.05 |
| 7,869,157 B2 * | 1/2011 | Nagashima | .......... | G11B 5/5552 360/77.04 |
| 8,363,350 B2 * | 1/2013 | Matsuzawa | .......... | G11B 5/5552 360/78.05 |
| 8,804,266 B2 * | 8/2014 | Hanya | ................. | G11B 5/5552 360/75 |
| 9,007,714 B1 * | 4/2015 | Zheng | ................. | G11B 5/5552 360/75 |
| 9,202,496 B2 | 12/2015 | Supino | | |
| 9,437,231 B1 * | 9/2016 | Ferris | ................... | G11B 5/5582 |
| 9,460,742 B1 * | 10/2016 | Shan | ................. | G11B 5/59694 |
| 9,536,553 B1 * | 1/2017 | Seo | ........................ | G11B 5/556 |
| 9,601,143 B1 * | 3/2017 | Seo | .................... | G11B 5/59694 |

* cited by examiner

*Primary Examiner* — Wayne Young
*Assistant Examiner* — James L Habermehl
(74) *Attorney, Agent, or Firm* — Faegre Baker Daniels LLP

(57) ABSTRACT

An apparatus includes voice coil motor (VCM) control circuitry and microactuator control circuitry. The VCM control circuitry includes a VCM disturbance observer configured to generate a VCM disturbance compensation signal. The microactuator control circuitry includes a microactuator disturbance observer configured to generate a microactuator disturbance compensation signal. The VCM disturbance observer and the microactuator disturbance observer are decoupled from each other.

20 Claims, 7 Drawing Sheets

LOOP SHAPING METHODS AND DEVICES FOR DISTURBANCE OBSERVER IN SERVO CONTROL SYSTEMS

SUMMARY

An apparatus includes voice coil motor (VCM) control circuitry and microactuator control circuitry. The VCM control circuitry includes a VCM disturbance observer configured to generate a VCM disturbance compensation signal. The microactuator control circuitry includes a microactuator disturbance observer configured to generate a microactuator disturbance compensation signal. The VCM disturbance observer and the microactuator disturbance observer are decoupled from each other.

A hard drive includes a voice coil motor (VCM) controller configured to generate a VCM control signal, a VCM disturbance observer configured to generate a VCM disturbance compensation signal, a microactuator controller configured to generate a microactuator control signal, and a microactuator disturbance observer configured to generate a microactuator disturbance compensation signal. The VCM disturbance compensation signal is generated in response to the microactuator control signal, and the microactuator disturbance compensation signal is generated in response to the microactuator control signal.

An integrated circuit includes means for controlling a position of a voice coil motor (VCM) assembly via a VCM control loop including a VCM disturbance observer, means for controlling a position of a microactuator via a microactuator control loop including a microactuator disturbance observer, and means for decoupling the VCM disturbance observer and the microactuator disturbance observer.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
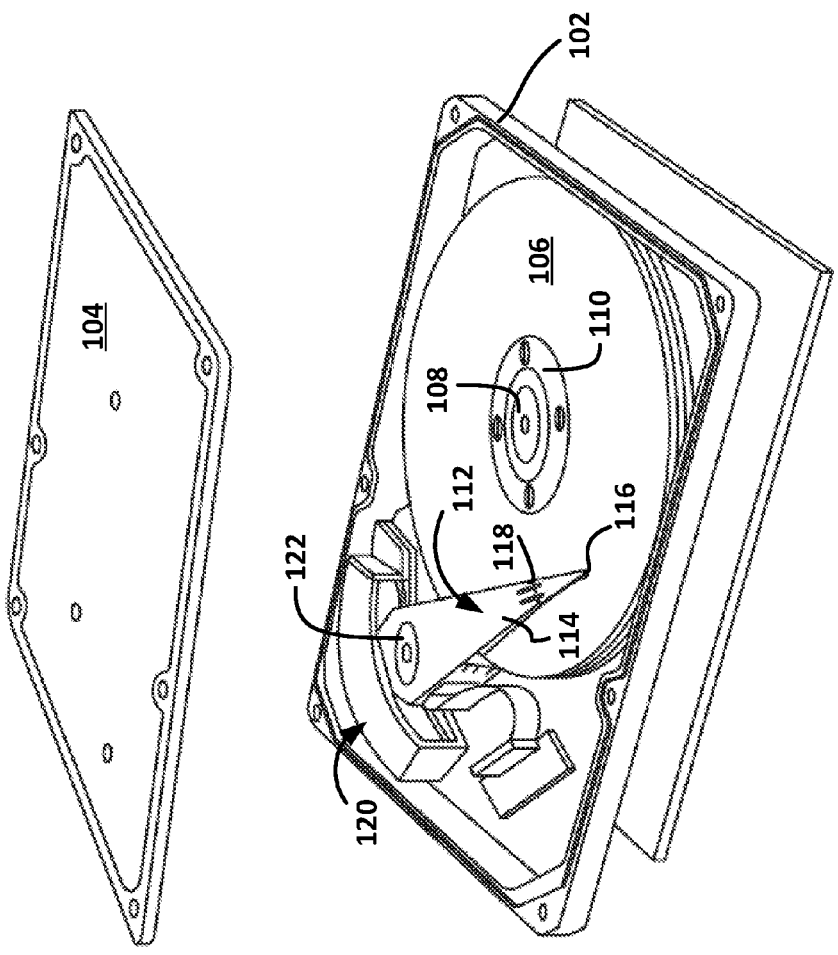
FIG. 1 shows an exploded, perspective view of a hard drive, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

Certain embodiments of the present disclosure are directed to servo control systems for multi-stage actuation systems, and more particularly, to disturbance compensation approaches that utilize disturbance observers for use in servo control systems.

Figure 2:
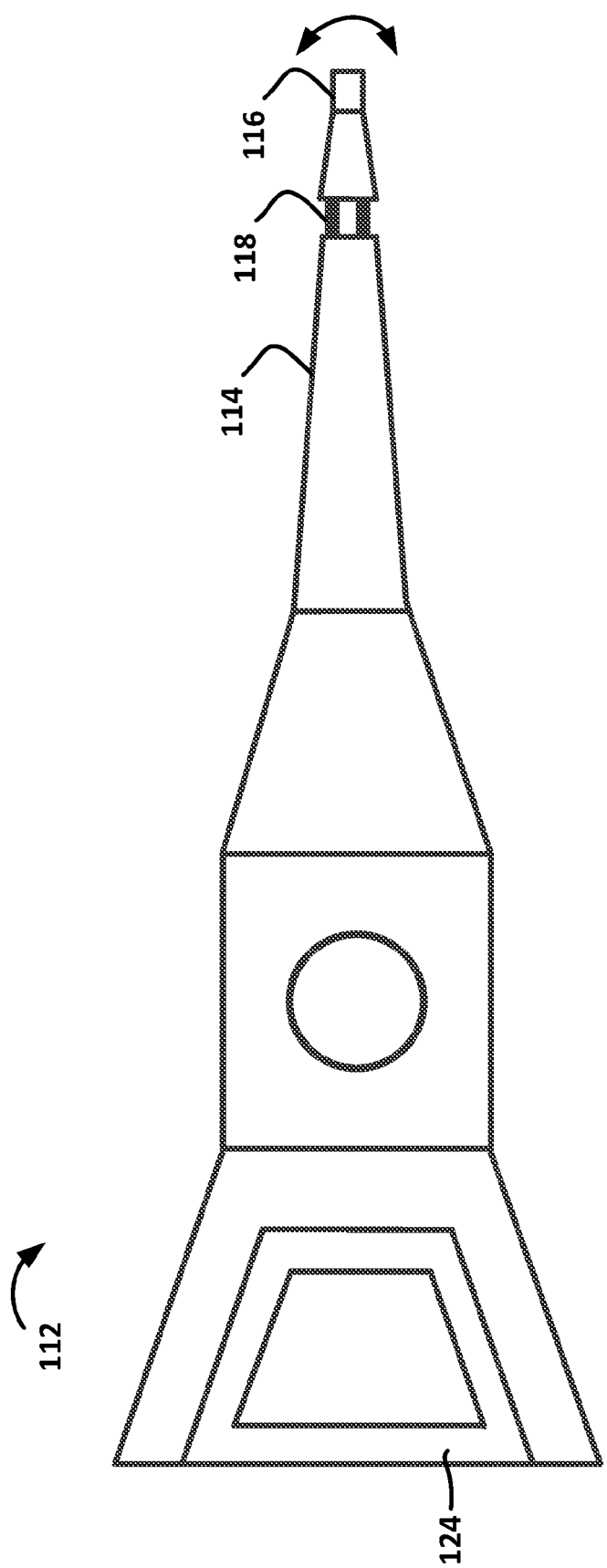
FIG. 2 shows a top view of an actuator assembly, in accordance with certain embodiments of the present disclosure.

FIG. 1 shows an exploded, perspective view of a hard drive 100 having a base deck 102 and top cover 104. The hard drive 100 includes magnetic recording disks 106 coupled to a spindle motor 108 by a disk clamp 110. The hard drive 100 also includes an actuator assembly 112 (shown in more detail in FIG. 2) coupled to a suspension 114 that positions read/write heads 116 over data tracks on the magnetic records disks 106. Each read/write head 116 can be coupled to a microactuator 118, which assists with positioning the read/write head 116 over a desired track on the magnetic recording disks 106. Each microactuator 118 can be positioned at least partially on or between the suspension 114 and one of the read/write heads 116. As appreciated by one skilled in the art, the read/write heads 116 may be coupled to the suspension 114 by a head-gimbal assembly (not shown). During operation, the spindle motor 108 rotates the magnetic recording discs 106 while the actuator assembly 112 is driven by a voice coil motor assembly 120 to pivot around a pivot bearing 122. The hard drive 100 further includes a servo control system—discussed in more detail below—that controls rotation of the actuator assembly 112 via the voice coil motor (VCM) assembly 120 and controls actuation of the microactuator 118 to position the read/write heads 116 over a desired track on the magnetic recording disks 106 for reading and writing operations. The actuator assembly 112 may be coupled to the pivot bearing 122 by an adhesive or a tolerance ring (not shown).

The voice coil motor assembly 120 (including a voice coil 124 shown in FIG. 2) and microactuator 118 are arranged to carry out various positioning operations (e.g., track seeking, track settling, track following) that position the read/write heads 116 over a desired track of the magnetic recording disks 106 to read data from or write data to a desired track. For example, in response to a command to read data from or write data to a track different from where a read/write head 116 is currently positioned (i.e., a track-seeking operation), a current may be applied to the voice coil 124 of the voice coil motor assembly 120 to rotate the actuator assembly 112 (and therefore the read/write head 116) towards the desired track. As the read/write head 116 nears the desired track, the microactuator 118 may be activated to assist the voice coil motor assembly 120 with settling over the desired track (i.e., a track-settling operation). For example, the microactuator 118 can include elements formed of lead-zirconate-titanate (PZT) and, as such, may extend (e.g., lengthen) in response to a positive applied voltage or contract (e.g., shorten) in response to a negative applied voltage. In certain configurations, when one of the PZT elements extends and the other PZT element shortens or maintains its length, the read/write head 116 will pivot (as denoted with arrows near the read/write head 116 in FIG. 2). Once the read/write head 116 is positioned over the desired track, the microactuator 118 may be used to compensate for small positioning errors (i.e., a track-follow operation). It is appreciated that the microactuator 118 may be positioned anywhere on actuator assembly 112. For example, the microactuator 118 may be positioned between the suspension 114 and the read/write head 116. In certain embodiments, the suspension 114 is separated into multiple sections and the microactuator 118 may be positioned between the multiple sections. Moreover, the actuator assembly 112 may include multiple sets of microactuators. For example, the hard drive 100 may utilize a dual- or triple-stage actuation system, which may refer to a number of actuation systems (e.g., voice coil motor assembly, microactuators) used by the hard drive 100 to position the read/write heads 116.

During operation, hard drives may experience internal disturbances and/or be subject to external disturbances that affect hard drive performance and can cause data reading and writing errors. External disturbances can include, for example, vibration in a computer chassis caused by acoustic signals generated by speakers coupled to the computer chassis. Internal disturbances can include one or more of the read/write heads 116 contacting the magnetic recording medium 106 or a particle and inducing vibration within the actuator assembly 112.

These disturbances may cause the actuator assembly 112 to vibrate to such an extent that the actuator assembly 112 is unable to accurately maintain a desired position over the magnetic recording disks 106. For example, the read/write heads 116 may be reading data from or writing data to a desired track on one of the magnetic recording disks 106 when the shock event occurs or while computer speakers play music. The disturbances may cause the actuator assembly 112 and the read/write heads 116 to move off the desired track (i.e., off-track). This results in reduced performance and/or writing or reading errors because the read/write heads 116 are knocked off-track—making it difficult for a positioning system (e.g., servo control system) to correct the position of the actuator assembly 112 before the read or write operation is completed. An off-track writing error may result in a hard error where the read/write heads 116 write data to an unknown track, which may overwrite already-written data. An off-track reading error may result in an operation called a read retry where the hard drive 100 attempts to re-read the desired data, which can affect performance of a computer using the hard drive 100.

Figure 3:
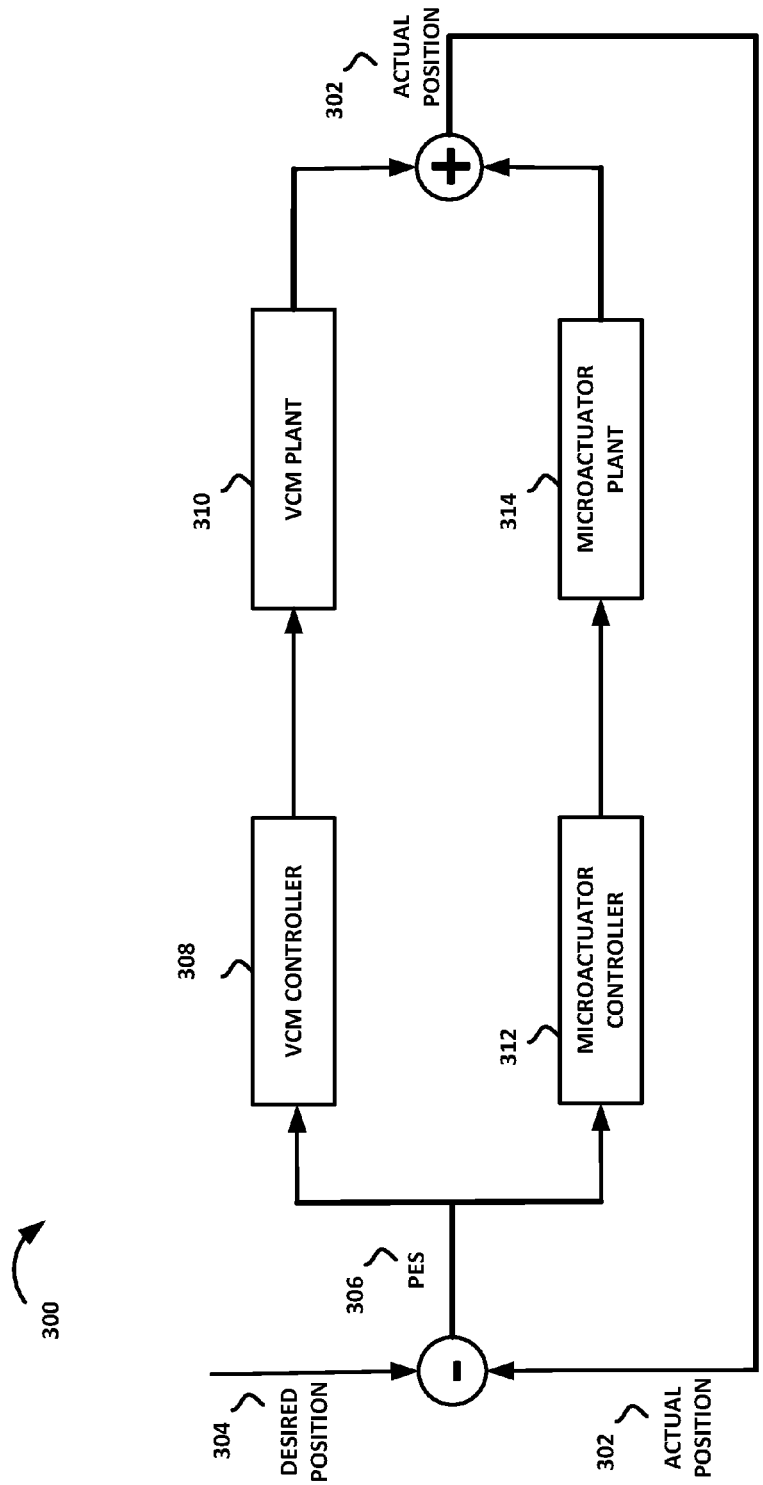
FIG. 3 shows a diagram of a servo control system.

FIG. 3 provides a high-level representation of a servo control system 300 that features parallel control paths (e.g., feedback control loops) used to position read/write heads 116. In operation, a read/write head 116 reads servo data (e.g., positioning data) embedded on a magnetic recording disk 106 to determine an actual position 302 of the read/write head 116 relative to tracks on the magnetic recording disk 106. The actual position 302 of the read/write head 116 is subtracted from a desired position 304 of the read/write head 116 to determine a position error signal (PES) 306, which is the difference between where the read/write head 116 is and should be positioned.

Generally, the PES 306 is used to adjust a position of a read/write head 116 with respect to tracks on the magnetic recording disk 106 such that the read/write head 116 is positioned over the desired track. For example, the PES 306 is inputted to a voice coil motor (VCM) controller 308, which assists with controlling current applied to the voice coil 124 for rotating the actuator control assembly 112. The position of the read/write head 116 resulting from positioning the VCM is represented in FIG. 3 by VCM plant 310. In parallel, the PES 306 is also inputted to a microactuator controller 312, which assists with controlling voltage applied to the microactuator 118 (e.g., PZT elements) for pivoting the read/write head 116. The position of the read/write head 116 resulting from positioning the microactuator is represented in FIG. 3 by microactuator plant 314.

Figure 4:
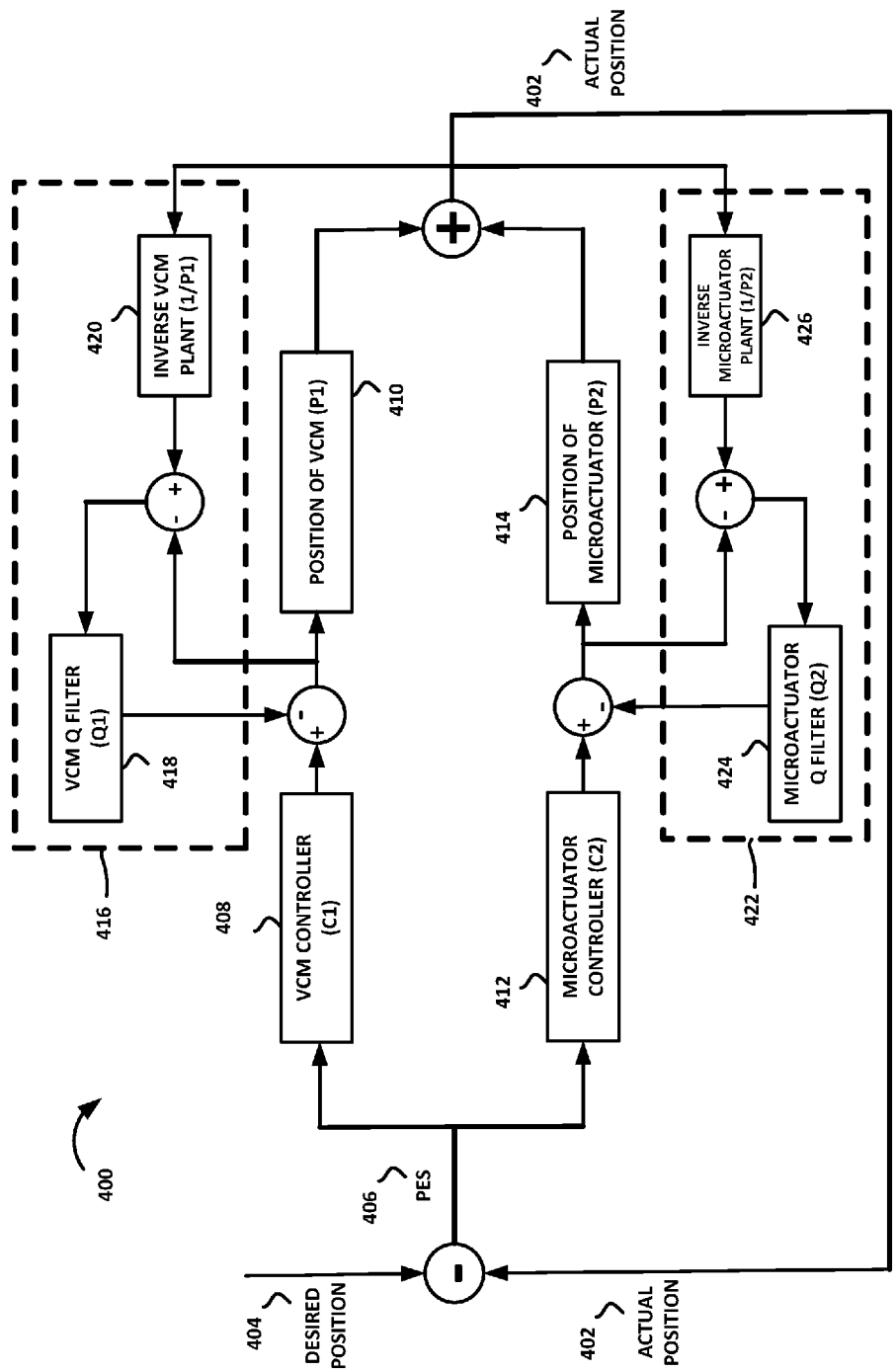
FIG. 4 shows a diagram of a servo control system.

FIG. 4 shows an example parallel servo control system 400 that utilizes disturbance observers, which are used to estimate disturbances. The estimated disturbances are used by the servo control system 400 to compensate for disturbances. Like the servo control system 300 of FIG. 3, the servo control system 400 subtracts an actual position 402 of a read/write head from a desired position 404 of the read/write head to determine a position error signal (PES) 406, which is the difference between where the read/write head is and should be positioned. PES 406 is inputted to a VCM controller 408 and a microactuator controller 412 to position the read/write head 116. In FIG. 4, the VCM controller 408 is also designated with a term, C1, which will be used in Equations 1-3. Likewise, other elements shown in FIG. 4 are designated with terms used in Equations 1-3. The position of the read/write head by the VCM is represented in FIG. 4 by VCM plant 410, and the position of the read/write head resulting from position of the microactuator is represented by microactuator plant 414.

FIG. 4 includes at least one disturbance observer for each servo control path, i.e., the VCM control path and the microactuator control path. A VCM disturbance observer 416 includes a VCM Q filter 418 and an inverse VCM plant 420. The VCM Q filter 418 can be a bandpass filter, for example, designed to compensate for certain disturbances better addressed by the VCM. A microactuator disturbance observer 422 includes a microactuator Q filter 424 and an inverse microactuator plant 426. The microactuator Q filter 424 can be a bandpass filter, for example, designed to compensate for certain disturbances better addressed by the microactuator.

Although useful for disturbance compensation, for certain applications, designing disturbance observers for the servo control system 400 of FIG. 4 can be complicated and time consuming. One concern is that the disturbance observers of the servo control system 400 are "coupled," in which the VCM disturbance observer 416 has a non-negligible effect on the microactuator disturbance observer 422 and/or vice versa. This coupling can be seen in FIG. 4 in that the VCM Q filter 418 affects the position of the VCM 410, which affects the actual position 402, which is inputted to the inverse microactuator plant 426, which affects the position of the microactuator 414. Equations 1-3 below, particularly Equation 3, show the effects of the VCM Q filter 418 has on the microactuator control loop terms and the effects of the microactuator Q filter 418 on the VCM control loop terms. As will described in more detail below, this complicates design of the VCM Q filter 418 and microactuator Q filter 424.

The terms in Equations 1-3 represent the following components of the servo control system 400:

$C_1$=VCM controller;
$C_2$=microactuator controller;
$P_1$=real plant dynamics for the VCM;
$P_2$=real plant dynamics for the microactuator;
$Q_1$=Q filter for the VCM disturbance compensator; and
$Q_2$=Q filter for the microactuator disturbance compensator.

Equation 1 represents an error sensitivity function, $S_{Base}$, (i.e., transfer function from disturbance to PES) of the servo control system 400 without the VCM disturbance observer 416 and the microactuator disturbance observer 422.

$$S_{Base} = \frac{1}{1 + C_1 P_1 + C_2 P_2} \qquad \text{Equation 1}$$

Equation 2 represents an error sensitivity function, $S_{DOB}$, of the servo control system 400 with the VCM disturbance observer 416 and the microactuator disturbance observer 422.

$$S_{DOB} = \frac{(1 - Q_1)(1 - Q_2)}{(1 + C_1 P_1 + C_2 P_2) - (Q_1 C_2 P_2 + Q_2 C_1 P_1 + Q_1 Q_2)} \qquad \text{Equation 2}$$

Equation 3 represents the ratio of $S_{DOB}$ over $S_{Base}$. This ratio is sometimes referred to as the $S_{ratio}$.

$$\frac{(1 - Q_1)(1 - Q_2)(1 + C_1 P_1 + C_2 P_2)}{(1 + C_1 P_1 + C_2 P_2) - (Q_1 C_2 P_2 + Q_2 C_1 P_1 + Q_1 Q_2)} \qquad \text{Equation 3}$$

If the ratio is determined to be less than one, it can be said that the servo control system 400 suppresses disturbances better with the disturbance observers than without them. It follows that—for the ratio to be less than one—the second term in the denominator of Equation 3 should be negligible, although it is appreciated that other approaches can result in a ratio less than one. In use, the inventors have found that the second term can be, in fact, typically substantial—resulting in the disturbance-observer servo control system performing comparatively worse than the base servo control system. The source of the sub-par performance is the coupling nature of the disturbance observers, which complicates design of the disturbance observers. This coupling nature causes changes to the VCM disturbance observer 416 to affect the performance of the microactuator disturbance observer 422, which requires designing and testing many disturbance observer designs to determine a set of designs that adequately compensate for disturbances. In particular, one may need to test several iterations of filter parameters (e.g., band, depth, center frequency, delay) and a number of filters or orders of filters before settling on a set of disturbance observer designs.

Figure 5:
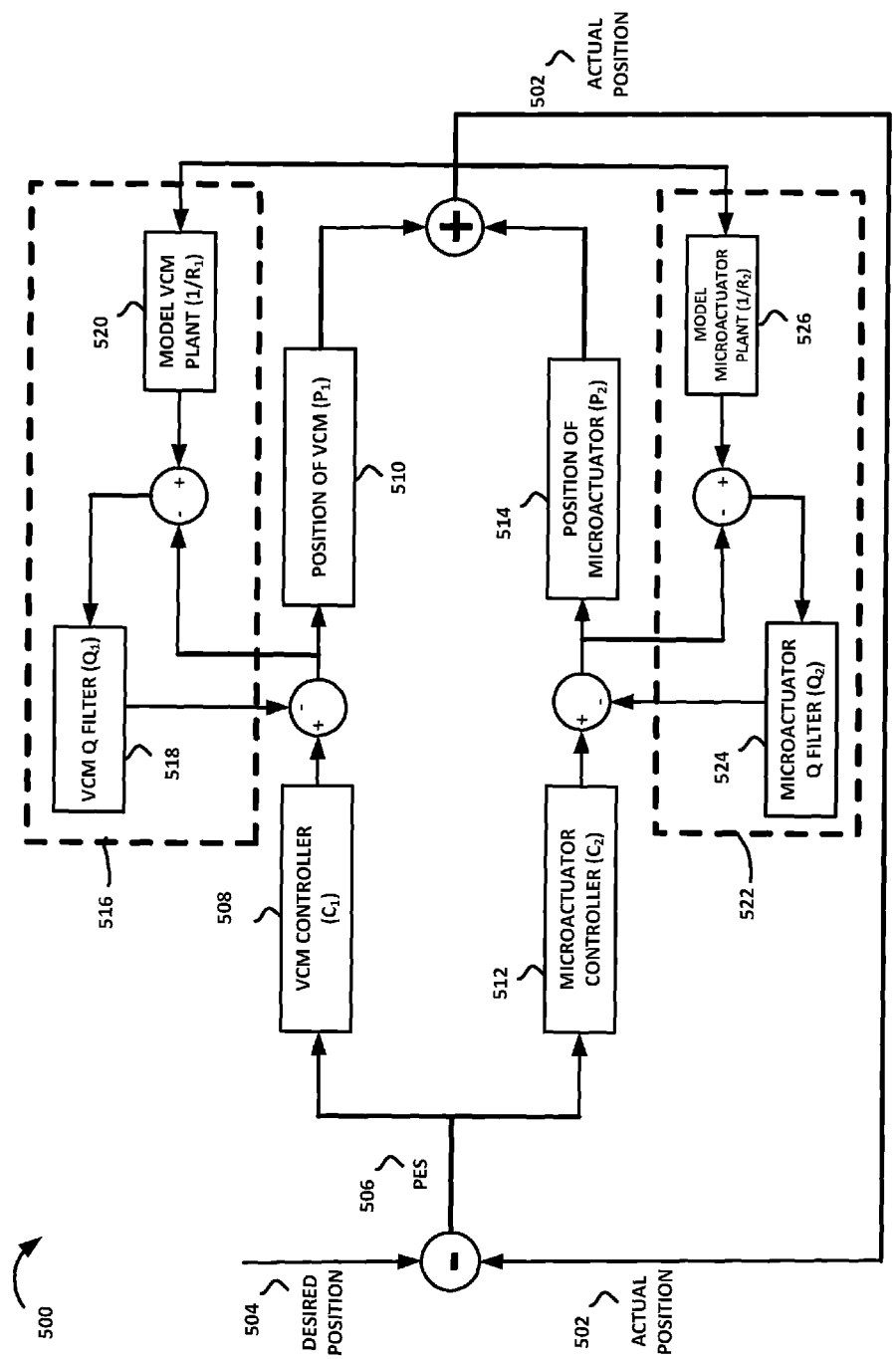
FIG. 5 shows a diagram of a servo control system shown, in accordance with certain embodiments of the present disclosure.

FIG. 5 presents a servo control system 500 having a structure useful for designing servo control systems with disturbance observers that are "decoupled" from each other and therefore can be designed independently. FIG. 5 includes much of the same components as FIG. 4—except that the inverse VCM plant 420 and the inverse microactuator plant 426 are replaced with a model VCM plant 520 and a model microactuator plant 526, respectively.

Figure 6:
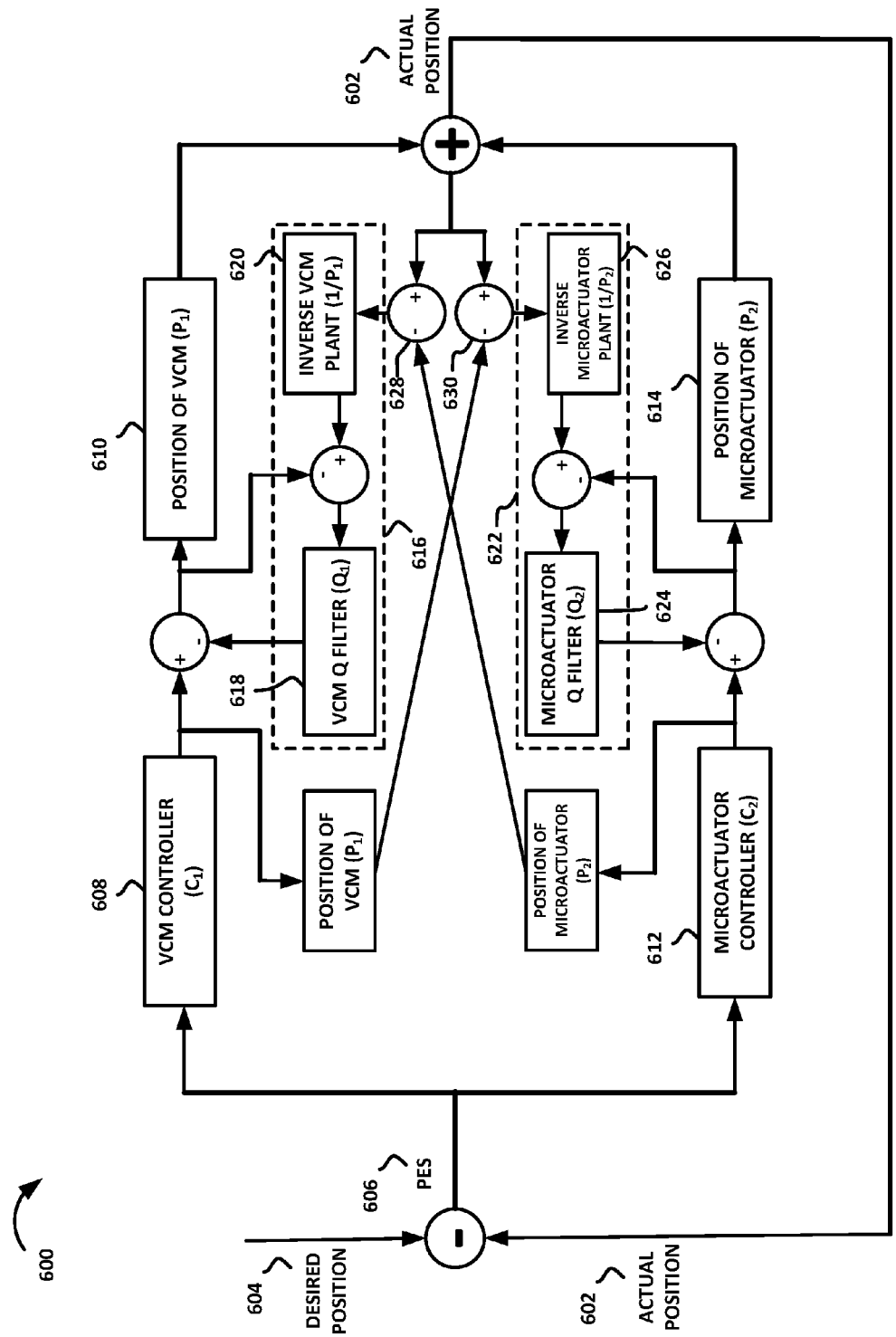
FIG. 6 shows a diagram of a servo control system shown, in accordance with certain embodiments of the present disclosure.
Figure 7:
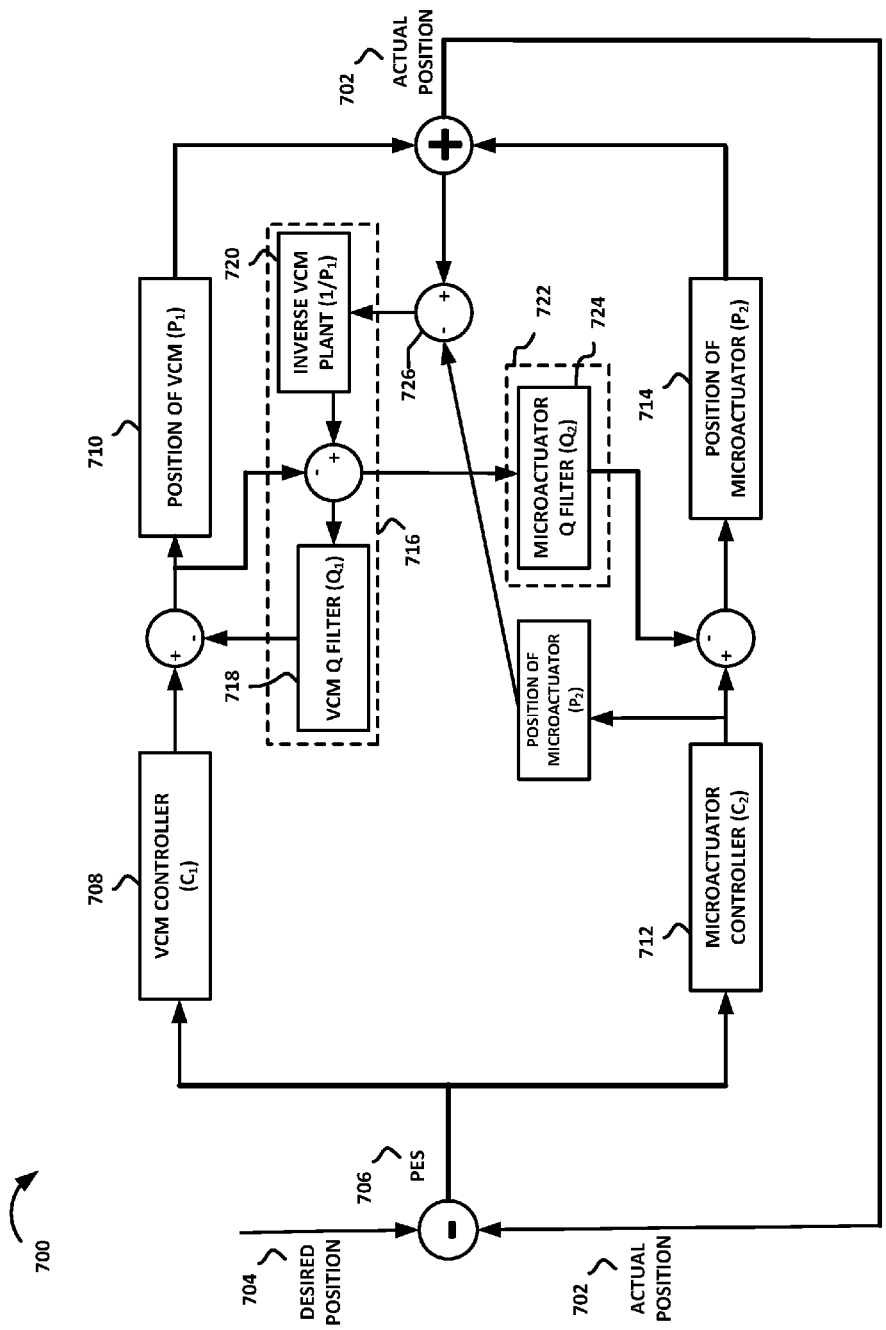
FIG. 7 shows a diagram of a servo control system shown, in accordance with certain embodiments of the present disclosure.

The model VCM plant 520 and the model microactuator plant 526 provide a structure to derive various parallel-type servo control systems with decoupled disturbance observers, where the effect of one disturbance observer to another disturbance observer is negligible. In other words, the servo control system 500 with the VCM plant 520 and the model microactuator plant 526 provides a basis to derive and test structures that decouple the VCM disturbance observer 516 from the microactuator disturbance observer 522 and therefore simplify design of the disturbance observers. This decoupling of the disturbance observers allows the VCM disturbance observer 516 to be designed to compensate for lower-frequency disturbance content and the microactuator disturbance observer 522 to be designed for higher frequency disturbance content. FIGS. 6 and 7 show specific examples of servo control systems—with "decoupled" disturbance observers—that have been designed using the construct provided by the servo control system 500 of FIG. 5.

To see how the servo control system 500 provides a useful construct, the equations provided below describe various components of the servo control system 500. Equations 4-8 represent a progression of terms of $S_{ratio}$—the ratio of $S_{DOB}$ over $S_{Base}$—using the structure and components of the servo control system 500, where the model VCM plant 520 and the model microactuator plant 526 are represented by terms $1/R_1$ and $1/R_2$, respectively. Equations 9 and 10 represent one example set of terms for $1/R_1$ and $1/R_2$, respectively, which can be used to simply the overall term for $S_{ratio}$. In other words, Equations 9 and 10 represent one approach to designing the model VCM plant 520 and the model microactuator plant 526 that result in a simplified ratio of $S_{DOB}$ over $S_{Base}$. This simplified $S_{ratio}$ is represented by Equation 11. The manifestation of these terms in a servo control system is shown in FIG. 6.

Equations 12 and 13 represent another example set of terms for $1/R_1$ and $1/R_2$, respectively, which can be used to simplify the overall term for $S_{ratio}$. This simplified $S_{ratio}$ is represent by Equation 14. The manifestation of these terms in a servo control system is shown in FIG. 7.

Equation 4 represents the numerator of the $S_{ratio}$, i.e., $S_{DOB}$ over $S_{Base}$.

$$\text{num}(S_{ratio}) = (1 - Q_1)(1 - Q_2)(1 + C_1 P_1 + C_2 P_2) \qquad \text{Equation 4:}$$

Equation 5 represents the denominator of $S_{DOB}$ over $S_{Base}$.

$$\text{den}(S_{ratio}) = 1 + C_1 P_1 + C_2 P_2 - Q_1 C_2 P_2 - Q_2 C_1 P_1 + Q_1 \frac{P_1}{R_1} + Q_2 \frac{P_2}{R_2} - Q_1 - Q_2 - Q_1 Q_2 \frac{P_2}{R_2} - Q_1 Q_2 \frac{P_1}{R_1} + Q_1 Q_2 \qquad \text{Equation 5}$$

Equation 6 simplifies the fourth through ninth term of Equation 5 by mathematical manipulation those terms.

$$-Q_1 \left( C_2 P_2 - \frac{P_1}{R_1} + 1 \right) - Q_2 \left( C_1 P_1 - \frac{P_2}{R_2} + 1 \right) \qquad \text{Equation 6}$$

Equation 7 simplifies the tenth through twelfth term of Equation 5 by mathematical manipulation those terms.

$$-Q_1 Q_2 \left( \frac{P_1}{R_1} + \frac{P_2}{R_2} - 1 \right) \qquad \text{Equation 7}$$

Equation 8 is a term that can be pulled out from Equations 6 and 7, which factors out the same term in Equation 4—resulting in a numerator of $(1 - Q_1)(1 - Q_2)$ for $S_{DOB}$ over $S_{Base}$.

$$(1 + C_1 P_1 + C_2 P_2) \qquad \text{Equation 8:}$$

Equations 9 and 10 represent terms of the model VCM plant 520 and the model microactuator plant 526, respectively, that are shown in FIG. 6.

$$R_1^{-1} = (C_2 P_2 + 1) P_1^{-1} \qquad \text{Equation 9:}$$

$$R_2^{-1} = (C_1 P_1 + 1) P_2^{-1} \qquad \text{Equation 10:}$$

Equation 11 represents a simplified $S_{ratio}$ (compared to that in Equation 3) using Equations 9 and 10 for the model VCM plant 520 and the model microactuator plant 526 of the servo control system 500. The manifestation of Equation 11 is shown the servo control system 600 of FIG. 6.

$$\frac{(1-Q_1)(1-Q_2)}{(1-Q_1Q_2)}$$

FIG. 6 shows a manifestation of a parallel servo control system 600 using the example terms of Equations 9 and 10. Like the servo control systems described above, the servo control system 600 subtracts an actual position 602 of a read/write head from a desired position 604 of the read/write head to determine a position error signal (PES) 606, which is the difference between where the read/write head is and should be positioned. PES 606 is inputted to a VCM controller 608 and a microactuator controller 612 to position the read/write head 116. The position of the read/write head by the VCM is represented in FIG. 6 by VCM plant 610, and the position of the read/write head resulting from position of the microactuator is represented by microactuator plant 614. The VCM controller 608 is configured to generate a VCM position signal in response to PES 606, and the microactuator controller 612 is configured to generate a microactuator control signal in response to PES 606.

Like the servo control system of FIG. 4, FIG. 6 includes at least one disturbance observer for each servo control path, i.e., the VCM control path and the microactuator control path. A VCM disturbance observer 616 includes a VCM Q filter 618 and an inverse VCM plant 620. A microactuator disturbance observer 622 includes a microactuator Q filter 624 and an inverse microactuator plant 626. As explained above, disturbance observers estimate disturbances and are used by servo control systems to compensate for disturbances (e.g., vibration).

The first difference between the servo control system 600 and the servo control system 400 is that the microactuator position signal forms part of the input to the VCM disturbance observer 616. This first difference is the manifestation of Equation 9 where the model VCM plant 520 of FIG. 5 is used to derive a structure $(C_2P_2+1)P_1^{-1}$ shown in FIG. 6. FIG. 6 shows the microactuator position signal being subtracted from the actual position 602 (see reference 628) to generate a VCM compensated actual position signal, which is inputted to the VCM disturbance observer 616. For example, the VCM compensated actual position signal can be inputted to the inverse VCM plant 620, which can represent an inverse model of VCM plant dynamics. Output of the VCM plant 620 is directed to the VCM Q filter 618 (discussed in more detail below), which can represent one or more filters configured to generate a VCM disturbance signal used to compensate for disturbances. The VCM disturbance signal is subtracted from the VCM position signal to generate a final VCM control signal that controls an amount of current applied to the coil 124 to position the actuator assembly 112 (and therefore read/write head 116) over a desired data track on the magnetic recording medium 106.

The second difference between the servo control system 600 and the servo control system 400 is that the VCM position signal forms part of the input to the microactuator disturbance observer 622. This second difference is the manifestation of Equation 10 where the model microactuator plant 526 of FIG. 5 is used to derive a structure $(C_1P_1+1)$ $P_2^{-1}$ shown in FIG. 6. FIG. 6 shows the VCM position signal being subtracted from the actual position 602 (see reference 630) to generate a microactuator compensated actual position signal, which is inputted to the microactuator disturbance observer 622. For example, the microactuator compensated actual position signal can be inputted to the inverse microactuator plant 626, which can represent an inverse model of microactuator plant dynamics. Output of the microactuator plant 626 is directed to the microactuator Q filter 624 (discussed in more detail below), which can represent one or more filters configured to generate a microactuator disturbance signal used to compensate for disturbances (e.g., vibration). The microactuator disturbance signal is subtracted from the microactuator position signal to generate a final microactuator control signal that controls an amount of voltage applied to the microactuator 118 to position the read/write head 116 over a desired data track on the magnetic recording medium 106.

The result of the first and second differences described above is shown in Equation 11, where the $S_{ratio}$ is simplified from that of Equation 3 with fewer terms and the filters of the disturbance observers are "decoupled" from one control path to another control path. By decoupling the filters, the VCM disturbance observer 616 and the microactuator disturbance observer 622 can be designed independent of each other. For example, the VCM Q filter 618 and the microactuator Q filter 624 can utilize various filters, such as bandpass filters and notch filters—the parameters of which (e.g., band, depth, center frequency, delay) can be chosen independently with fewer iterations and fewer variables. Independence can also allow use of simpler, lower-order filter designs that provide equal or better disturbance compensation than more complicated, higher-order filters. It should be noted that filter design dictates how servo control systems respond to and compensate for disturbances. In particular, filters can be used to control the shape of feedback control loops such that targeted disturbance frequencies are compensated for (e.g., rejected) such that PES is reduced. Reduced PES results in read/write heads being better positioned over desired data tracks on the magnetic recording media.

FIG. 7 shows a manifestation of a parallel servo control system 700 using the example terms of Equations 12 and 13, shown below. Like the servo control systems described above, the servo control system 700 subtracts an actual position 702 of a read/write head from a desired position 604 of the read/write head to determine a position error signal (PES) 706, which is the difference between where the read/write head is and should be positioned. PES 706 is inputted to a VCM controller 608 and a microactuator controller 712 to position the read/write head 116. The position of the read/write head by the VCM is represented in FIG. 7 by VCM plant 710, and the position of the read/write head resulting from position of the microactuator is represented by microactuator plant 714. The VCM controller 708 is configured to generate a VCM position signal in response to PES 706, and the microactuator controller 712 is configured to generate a microactuator control signal in response to PES 706. A VCM disturbance observer 716 includes a VCM Q filter 718 and an inverse VCM plant 720. A microactuator disturbance observer 722 includes a microactuator Q filter 724.

Equations 12 and 13 show another example of using the model VCM plant 520 and model microactuator plant 526, respectively, to derive structures that decouple disturbance observers. Equation 14 shows a simplified $S_{ratio}$ resulting from model VCM plant 520 and model microactuator plant 526 terms in Equations 12 and 13.

$$R_1^{-1} = (C_2 P_2 + 1) P_1^{-1} \quad \text{Equation 12:}$$

$$R_2^{-1} = R_1^{-1}(C_2 - C_1) \quad \text{Equation 13:}$$

$$\frac{(1 - Q_1)}{(1 + P_2 / P_1 Q_2)} \quad \text{Equation 14}$$

The first difference between the servo control system 700 and the servo control system 400 is that the microactuator position signal forms part of the input to the VCM disturbance observer 716. This first difference is the manifestation of Equation 12 where the model VCM plant 520 of FIG. 5 is used to derive a structure $(C_2 P_2 + 1) P_1^{-1}$ shown in FIG. 7. FIG. 7 shows the microactuator position signal being subtracted from the actual position 702 (see reference 726) to generate a VCM compensated actual position signal, which is inputted to the VCM disturbance observer 716. For example, the VCM compensated actual position signal can be inputted to the inverse VCM plant 720, which can represent an inverse model of VCM plant dynamics. Output of the VCM plant 720 is directed to the VCM Q filter 718, which can represent one or more filters configured to generate a VCM disturbance signal used to compensate for disturbances. The VCM disturbance signal is subtracted from the VCM position signal to generate a final VCM control signal that controls an amount of current applied to the coil 124 to position the actuator assembly 112 (and therefore read/write head 116) over a desired data track on the magnetic recording medium 106.

The second difference between the servo control system 700 and the servo control system 400 is that the input to the VCM Q filter 718 is also input to the microactuator disturbance observer 722 (e.g., microactuator Q filter 724). This second difference is the manifestation of Equation 13 where the model microactuator plant 526 of FIG. 5 is used to derive a structure shown in FIG. 7. FIG. 7 shows that the microactuator disturbance observer 722 is configured to generate a microactuator disturbance signal in response to the inverse VCM plant 720. The microactuator disturbance signal is subtracted from the microactuator position signal to generate a final microactuator position signal that controls voltage applied to the microactuator 118 to position the read/write head 116 over a desired data track on the magnetic recording medium 106.

The result of the first and second differences is shown in Equation 14, where the $S_{ratio}$ is simplified from that of Equation 3 with fewer terms and the filters of the disturbance observers are "decoupled" from one control path to another control path, which is explained in more detail above.

The various embodiments and components described above may be implemented using firmware, integrated circuits, and/or software modules that interact with each other or are combined together. For example, the control diagrams illustrated herein may be used to create computer-readable instructions/code for execution by a processor. Such instructions may be stored on a non-transitory computer-readable medium and transferred to a processor for execution. In another example, the embodiments and components described above, such as components of the various servo control systems described above and shown in the figures, are implemented in one or more application-specific integrated circuits (ASIC) and/or other circuitry. The structures and procedures shown above are only a representative example of embodiments that can be used to provide the functions described hereinabove.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. An apparatus comprising:
   voice coil motor (VCM) control circuitry comprising a VCM disturbance observer configured to generate a VCM disturbance compensation signal and a VCM controller configured to generate a VCM position signal to be modified by the VCM disturbance compensation signal to generate a final VCM control signal; and
   microactuator control circuitry comprising a microactuator disturbance observer configured to generate a microactuator disturbance compensation signal and a microactuator controller configured to generate a microactuator position signal to be modified by the microactuator disturbance compensation signal to generate a final microactuator control signal,
   wherein the VCM disturbance compensation signal is generated in response to the microactuator position signal.

2. The apparatus of claim 1, wherein the VCM controller is configured to generate the VCM position signal in response to a position error signal, and wherein the microactuator controller is configured to generate the microactuator control signal in response to the position error signal.

3. The apparatus of claim 1, wherein the microactuator position signal is subtracted from a signal representing an actual position of a read/write head to generate a compensated VCM actual position signal.

4. The apparatus of claim 3, wherein the VCM disturbance compensation signal is generated in response to the compensated VCM actual position signal.

5. The apparatus of claim 3, wherein the microactuator disturbance compensation signal is generated in response to the compensated VCM actual position signal.

6. The apparatus of claim 1, wherein the final microactuator control signal is generated by subtracting the microactuator disturbance compensation signal from the microactuator control signal.

7. The apparatus of claim 1, wherein the VCM disturbance observer includes at least one filter configured to generate the VCM disturbance compensation signal.

8. The apparatus of claim 7, wherein the at least one filter is either a bandpass filter or a notch filter.

9. The apparatus of claim 1, wherein the final VCM control signal is generated by subtracting the VCM disturbance compensation signal from the VCM control signal.

10. The apparatus of claim 1, wherein the microactuator disturbance compensation signal is generated in response to the VCM position signal.

11. The apparatus of claim 1, wherein the VCM disturbance observer and the microactuator disturbance observer are decoupled from each other.

12. A hard drive comprising:

a voice coil motor (VCM) controller configured to generate a VCM position signal;

a VCM disturbance observer configured to generate a VCM disturbance compensation signal to modify the VCM position signal to generate a final VCM control signal;

a microactuator controller configured to generate a microactuator position signal; and a microactuator disturbance observer configured to generate a microactuator disturbance compensation signal to modify the microactuator position signal to generate a final microactuator control signal, wherein the VCM disturbance compensation signal is generated in response to the microactuator position signal.

13. The hard drive of claim 12, further comprising:

an actuator assembly coupled to a read/write head, wherein the actuator assembly positions the read/write head in response to the final VCM control signal.

14. The hard drive of claim 13, further comprising:

a microactuator coupled to the actuator assembly and the read/write head, wherein the microactuator positions the read/write head in response to the final microactuator control signal.

15. The hard drive of claim 12, wherein the VCM disturbance observer and the microactuator disturbance observer are decoupled from each other.

16. The hard drive of claim 12, wherein the VCM disturbance observer includes at least one filter configured to generate the VCM disturbance compensation.

17. The hard drive of claim 16, wherein the at least one filter is either a bandpass filter or a notch filter.

18. The hard drive of claim 12, wherein the microactuator disturbance observer includes at least one filter configured to generate the microactuator disturbance compensation.

19. The hard drive of claim 18, wherein the at least one filter is either a bandpass filter or a notch filter.

20. The hard drive of claim 12, wherein the microactuator disturbance compensation signal is generated in response to the microactuator position signal.

* * * * *

UNITED STATES PATENT AND TRADEMARK OFFICE
CERTIFICATE OF CORRECTION

PATENT NO. : 9,928,862 B1  
APPLICATION NO. : 15/280525  
DATED : March 27, 2018  
INVENTOR(S) : Sung Won Park et al.

Page 1 of 1

It is certified that error appears in the above-identified patent and that said Letters Patent is hereby corrected as shown below:

"(73) Assignee":
The Assignee whose name reads "Segate Technology LLC" should read --Seagate Technology LLC--.

Signed and Sealed this
Twenty-ninth Day of May, 2018

Andrei Iancu
*Director of the United States Patent and Trademark Office*